July 12, 1966   R. W. BURDEN ET AL   3,260,483
HELICOPTER ENGINE EXHAUST EJECTOR
Filed Nov. 25, 1964   2 Sheets-Sheet 1
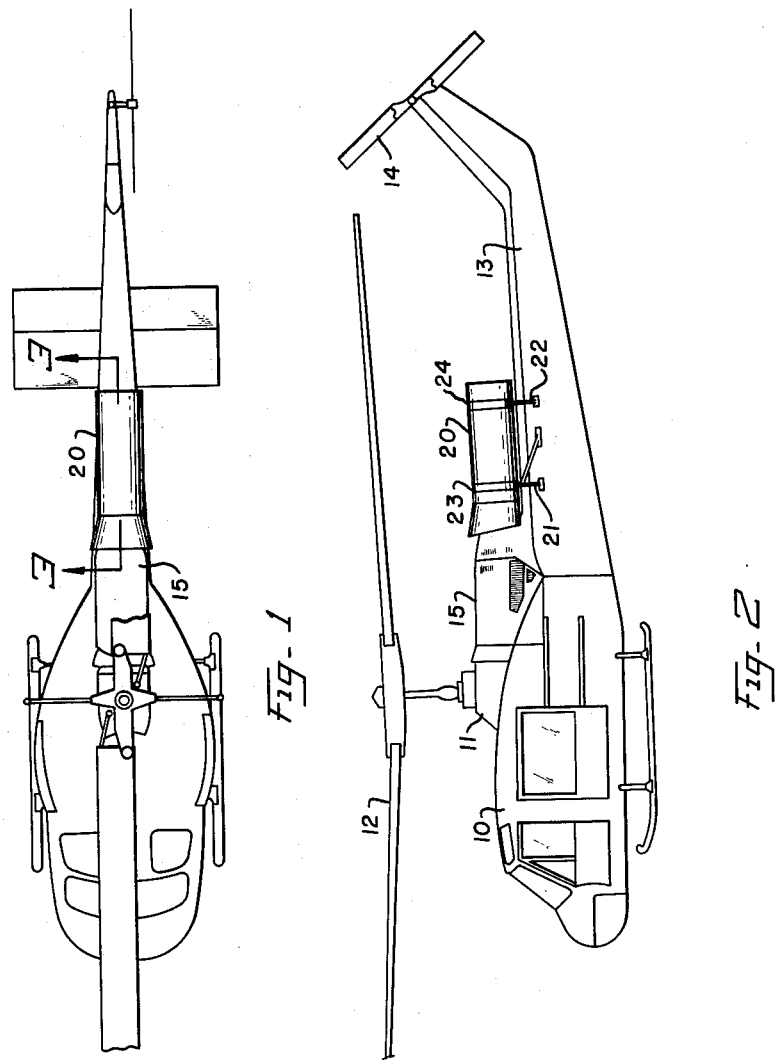
INVENTORS
ROBERT W. BURDEN
BY OWEN G. ROBBINS
Harry M. Saraspoorty,
Edward J. Kelly, Herbert Berl
& James W. Colvin   ATTORNEYS July 12, 1966   R. W. BURDEN ET AL   3,260,483
HELICOPTER ENGINE EXHAUST EJECTOR Filed Nov. 25, 1964   2 Sheets-Sheet 2

INVENTORS
ROBERT W. BURDEN
BY OWEN G. ROBBINS
ATTORNEYS

# United States Patent Office 3,260,483
Patented July 12, 1966

3,260,483
HELICOPTER ENGINE EXHAUST EJECTOR
Robert W. Burden and Owen G. Robbins, Dallas, Tex., assignors, by mesne assignments, to the United States of America as represented by the Secretary of the Army
Filed Nov. 25, 1964, Ser. No. 414,035
3 Claims. (Cl. 244—53)

This invention relates to improvements in exhaust ejectors for turbojet engines and more particularly to an ejector for cooling the exhaust and suppressing the visibility of infra-red radiation from the exhaust.

Suppression of infra-red radiation from aircraft has become extremely important from a military point of view since the recent development of highly sensitive infra-red detection devices and infra-red or heat seeking missiles. Such devices are used for spotting low altitude aircraft from the ground as well as for missile guidance devices. Suppression of the visibility of the infra-red end of the radiation spectrum of engine exhausts not only defeats the detection devices but also renders the aircraft less readily visible at night to personnel as well as instruments.

It is therefore among the objects of the invention to provide an engine exhaust ejector device which can be mounted on an aircraft to receive and eject the exhaust of the aircraft engine and suppress to a valuable extent, the infra-red radiation of the engine exhaust gas.

A further object resides in the provision of an aircraft engine exhaust ejector which is effective to mix a sufficient quantity of atmospheric air with the engine exhaust to reduce the temperature of the exhaust to an extent such that the exhaust will not cause visible or readily detectable infra-red radiation from the walls of the ejector.

A still further object resides in the provision of an engine exhaust ejector of the character indicated provided with outlet baffles which effectively screen the interior of the ejector from view from any angle.

An additional object resides in the provision of an infra-red radiation suppressing exhaust ejector for an aircraft engine which is constructed and constituted to effectively suppress infra-red radiation.

Other objects and advantages will become apparent from a consideration of the following description and the appended claims in conjunction with the accompanying drawings wherein:

FIG. 1 is a top plan view of a rotary wing aircraft with an engine exhaust ejector illustrative of the invention mounted thereon;

FIG. 2 is a side elevational view of the aircraft-ejector combination shown in FIG. 1;

Figure 3:
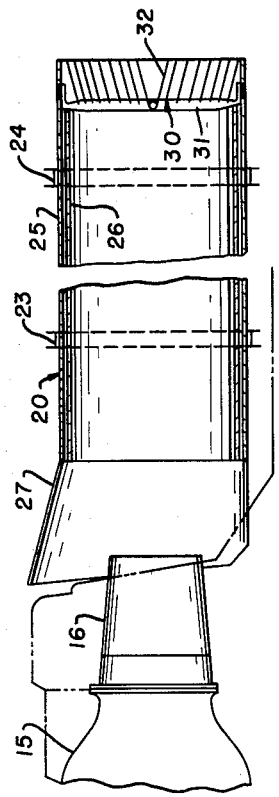
FIG. 3 is a longitudinal cross sectional view of the ejector taken substantially on a plane indicated by the line 3—3 on FIG. 1.
Figure 4:
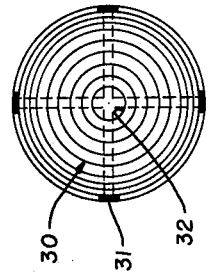
FIG. 4 is an aft end elevational view of the exhaust ejector shown in FIG. 1.

With continued reference to the drawings, the aircraft illustrated is a well known type of military helicopter having a fuselage 10, a pylon 11 extending upwardly from the fuselage and supporting the main rotor 12. The tail boom 13 extends rearwardly from the rear end of the fuselage and carries at its rear end the tail rotor 14. Both rotors are driven through suitable transmission mechanisms and shafting by the engine 15. The engine 15, as illustrated, is a gas turbine engine of appropriate horsepower, and is mounted on the fuselage 10 aft of the pylon 11. The engine has a rearwardly directed exhaust nozzle 16 of slightly conical shape which directs the exhaust jet rearwardly above the tail boom.

While a particular aircraft has been illustrated and briefly described above, it is to be understood that the invention is in no way limited to the application of the exhaust ejector to any particular aircraft but, that the ejector may be applied to any suitable aircraft, either rotary wing or fixed wing, without in any way exceeding the scope of the invention.

The exhaust ejector, generally indicated at 20, comprises an elongated, cylindrical hollow body, mounted on the tail boom structure immediately aft of the engine 15. Suitable frames 21 and 22 are secured to the aircraft structure and the ejector is secured on these frames by suitable bands 23 and 24 which surround the cylindrical body at locations spaced apart longitudinally thereof and are attached to the corresponding frames.

The cylindrical body of the ejector is double walled, having an outer wall 25 and an inner wall 26 uniformly spaced from the outer wall a distance sufficient to provide an airflow passage between the two walls. The flow of air through this passage is sufficient to maintain the temperature of the outer wall below the infra-red emitting range. Additionally the outer wall, or both inner and outer walls may be coated or plated with a low emissivity coating such as gold, silver, platinum or aluminum.

A flared inlet hood 27 is provided at the front end of the ejector to receive the aft portion of the exhaust nozzle 16 and is connected at its rearward edge to the forward edge of the outer wall 25. This hood has a diameter materially greater than the diameter of the exhaust nozzle 16 to provide around the exhaust nozzle an open space for the flow of atmospheric air into the ejector in surrounding relationship to the exhaust gas jet entering the ejector from the nozzle 16. The area of the annular passage is controlled by the quantity, velocity and temperature of the exhaust gas to be cooled and the effectiveness of the exhaust jet in entraining air for passage through the exhaust ejector. In this connection, it is important to obtain complete combustion of the engine fuel, within practical limits, before the combustible mixture is ejected from the engine as, otherwise, the mixing of exhaust gas and atmospheric air in the exhaust ejector could cause after burning with an undesirable increase in the temperature of the gases passing through the ejector.

If the aft or exit end of the ejector were left completely open a heat guided, target seeking missile to the rear of the aircraft could view the hot exhaust nozzle or the emergent exhaust gas through the body of the ejector. To overcome this possibility a set of annular baffles, generally indicated at 30, is mounted in the aft end of the ejector body. The baffle assembly comprises a plurality, eight being illustrated, of concentric baffles of frustroconical shape supported on a suitable framework 31 having radially disposed arms. The inner baffle 32 is closed and the remaining baffles are so spaced in accordance with their depth and conical angle that the larger diameter or rearward edge of each baffle overlies the smaller diameter or forward edge of the adjacent outer baffle so that the baffle assembly effectively screens the exhaust nozzle and other hot parts of the engine from view from any position to the rear of the exhaust ejector. The baffles may be plated or coated with an emission inhibiting material if desired, but, since the baffles are spaced from the exhaust nozzle and are subjected only to a mixture of exhaust gas and atmospheric air, their operating temperature will normally not be sufficiently high to require such a coating or plating.

While a particular embodiment of the invention has been hereinabove described and illustrated in the accompanying drawings it is to be understood that the scope of the invention is in no way limited to the particular embodiment so described and illustrated but is commensurate with the scope of the appended claims.

We claim:

1. Apparatus for suppressing infra-red radiation from a gas turbine engine having an exhaust nozzle comprising, an elongated hollow cylindrical body mounted rearwardly of said engine and having a double wall construction with an air passage between outer and inner walls, a hood structure on the front end of said body receiving the engine exhaust nozzle and providing around said nozzle an open passage for the flow of atmospheric air to cool said air passage and into said body for cooling the exhaust gases ejected into said body from said nozzle and a baffle assembly secured in the rear end of said hollow body having mutually overlapping concentric baffles effective to both screen from view through said hollow body said engine exhaust nozzle received in said hood structure and to spread the cooled exhaust gases to avoid detection by heat tracking devices.

2. An apparatus as claimed in claim 1 wherein the baffle assembly is closed in the center with a plurality of concentric baffles of frusto-conical shape, said baffles in spaced relation to their depth and conical angle, the rearward edge with the larger diameter of each baffle overlying the forward edge of smaller diameter of the adjacent outer baffle to effectively screen from any rear position the exhaust nozzle and other hot engine parts.

3. An apparatus as claimed in claim 1 wherein the baffle assembly, closed in the center, screens and spreads both the gases from the exhaust nozzle and from the air passage between the walls.

References Cited by the Examiner

UNITED STATES PATENTS 3,067,968 11/1962 Heppenstall _____ 244—74
3,210,934 10/1965 Smale _____ 60—35.6

FOREIGN PATENTS 763,236 12/1956 Great Britain.

MILTON BUCHLER, *Primary Examiner.*

L. C. HALL, *Assistant Examiner.*